(12) United States Patent
March

(10) Patent No.: US 10,727,552 B2
(45) Date of Patent: Jul. 28, 2020

(54) HEAT EXCHANGER PLATE FOR ELECTRIFIED VEHICLE BATTERY PACKS

(71) Applicant: FORD GLOBAL TECHNOLOGIES, LLC, Dearborn, MI (US)

(72) Inventor: Zachary March, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 768 days.

(21) Appl. No.: 14/931,897

(22) Filed: Nov. 4, 2015

(65) Prior Publication Data

US 2017/0125863 A1    May 4, 2017

(51) Int. Cl.
*H01M 10/6554* (2014.01)
*H01M 10/6561* (2014.01)
*H01M 10/613* (2014.01)
*H01M 10/625* (2014.01)
*H01M 10/6556* (2014.01)

(52) U.S. Cl.
CPC ..... *H01M 10/6554* (2015.04); *H01M 10/613* (2015.04); *H01M 10/625* (2015.04); *H01M 10/6556* (2015.04); *H01M 10/6561* (2015.04); *H01M 2220/20* (2013.01)

(58) Field of Classification Search
CPC ......... H01M 10/6554; H01M 10/6556; H01M 10/613
See application file for complete search history.

(56) References Cited

U.S. PATENT DOCUMENTS

| 4,141,412 A | * | 2/1979 | Culbertson | ........... F28D 9/0068 |
| | | | | 165/166 |
| 7,156,159 B2 | | 1/2007 | Lovette et al. | |
| 7,431,030 B2 | * | 10/2008 | Nocera | ................... F24S 80/60 |
| | | | | 126/643 |
| 8,304,104 B2 | * | 11/2012 | Lee | ..................... B60L 11/1874 |
| | | | | 429/120 |
| 8,790,808 B2 | | 7/2014 | Herrmann et al. | |
| 9,054,402 B1 | * | 6/2015 | Rawlinson | .............. F41H 7/042 |
| 2013/0183555 A1 | | 7/2013 | Boddakayala | |
| 2014/0038012 A1 | | 2/2014 | Alimario et al. | |
| 2015/0194711 A1 | | 7/2015 | Rawlinson | |
| 2015/0244039 A1 | | 8/2015 | Jairazbhoy et al. | |

FOREIGN PATENT DOCUMENTS

| EP | 1318362 A2 | * | 6/2003 | ............. F24H 3/105 |
| EP | 2851991 | * | 3/2015 | |

* cited by examiner

*Primary Examiner* — Ula C Ruddock
*Assistant Examiner* — Thomas H. Parsons
(74) *Attorney, Agent, or Firm* — David B. Kelley; Carlson, Gaskey & Olds

(57) ABSTRACT

A battery pack according to an exemplary aspect of the present disclosure includes, among other things, a heat exchanger plate including a plate body including an interior wall and an exterior wall and an air gap enclosed inside the plate body and extending between the interior wall and the exterior wall.

24 Claims, 4 Drawing Sheets

HEAT EXCHANGER PLATE FOR ELECTRIFIED VEHICLE BATTERY PACKS

TECHNICAL FIELD

This disclosure relates to a battery pack for an electrified vehicle. The battery pack includes a heat exchanger plate having an integrated air gap. The air gap is configured to thermally isolate an internal cooling circuit of the heat exchanger plate from an exterior environment of the pack.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering electric machines and other electrical loads typically includes multiple battery cells. The battery cells release heat during charging and discharging operations. It is often desirable to dissipate this heat from the battery pack to improve capacity and life of the battery cells.

SUMMARY

A battery pack according to an exemplary aspect of the present disclosure includes, among other things, a heat exchanger plate including a plate body including an interior wall and an exterior wall and an air gap enclosed inside the plate body and extending between the interior wall and the exterior wall.

In a further non-limiting embodiment of the foregoing battery pack, the interior wall includes an exterior surface that faces toward an interior of the battery pack.

In a further non-limiting embodiment of either of the foregoing battery packs, the exterior wall includes an exterior surface that is exposed to an exterior environment.

In a further non-limiting embodiment of any of the foregoing battery packs, the air gap extends between the exterior wall and an internal wall of the plate body.

In a further non-limiting embodiment of any of the foregoing battery packs, the internal wall establishes a floor of an internal cooling circuit disposed inside the plate body.

In a further non-limiting embodiment of any of the foregoing battery packs, the internal cooling circuit establishes a serpentine passage inside the plate body.

In a further non-limiting embodiment of any of the foregoing battery packs, the plate body includes a first plate piece, a second plate piece and a third plate piece that are connected together.

In a further non-limiting embodiment of any of the foregoing battery packs, at least one standoff extends between the exterior wall and an internal wall of the plate body.

In a further non-limiting embodiment of any of the foregoing battery packs, the air gap is a static pocket of air inside the plate body.

In a further non-limiting embodiment of any of the foregoing battery packs, the air gap is configured to limit the thermal transfer of heat from an exterior environment into an internal cooling circuit disposed inside the plate body.

A battery pack according to another exemplary aspect of the present disclosure includes, among other things, an enclosure defining an interior, a battery array housed within the interior, a heat exchanger plate including an interior wall proximate the battery array and an exterior wall exposed to an exterior environment outside of the enclosure, and an air gap disposed inside the heat exchanger plate.

In a further non-limiting embodiment of the foregoing battery pack, the battery array includes a plurality of battery cells positioned relative to the interior wall of the heat exchanger plate.

In a further non-limiting embodiment of either of the foregoing battery packs, the heat exchanger plate includes an internal cooling circuit including a plurality of fluid channels.

In a further non-limiting embodiment of any of the foregoing battery packs, a plurality of walls divide the plurality of fluid channels.

In a further non-limiting embodiment of any of the foregoing battery packs, the internal cooling circuit establishes a serpentine passage.

In a further non-limiting embodiment of any of the foregoing battery packs, the heat exchanger plate forms a base of the enclosure.

In a further non-limiting embodiment of any of the foregoing battery packs, the heat exchanger plate forms a sidewall of the enclosure.

In a further non-limiting embodiment of any of the foregoing battery packs, the air gap extends between the exterior wall and an internal wall disposed inside the heat exchanger plate.

In a further non-limiting embodiment of any of the foregoing battery packs, the internal wall establishes a floor of an internal cooling circuit disposed inside the heat exchanger plate.

In a further non-limiting embodiment of any of the foregoing battery packs, the air gap is configured to limit the thermal transfer of heat from the exterior environment into an internal cooling circuit of the heat exchanger plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. A heat exchanger plate is utilized to thermally manage heat generated by battery cells of a battery pack. In some embodiments, the heat exchanger plate includes an integrated air gap configured to limit the thermal transfer of heat from an outside environment to an internal cooling circuit of the plate. These and other features are discussed in greater detail in the following paragraphs of this detailed description.

Figure 1:
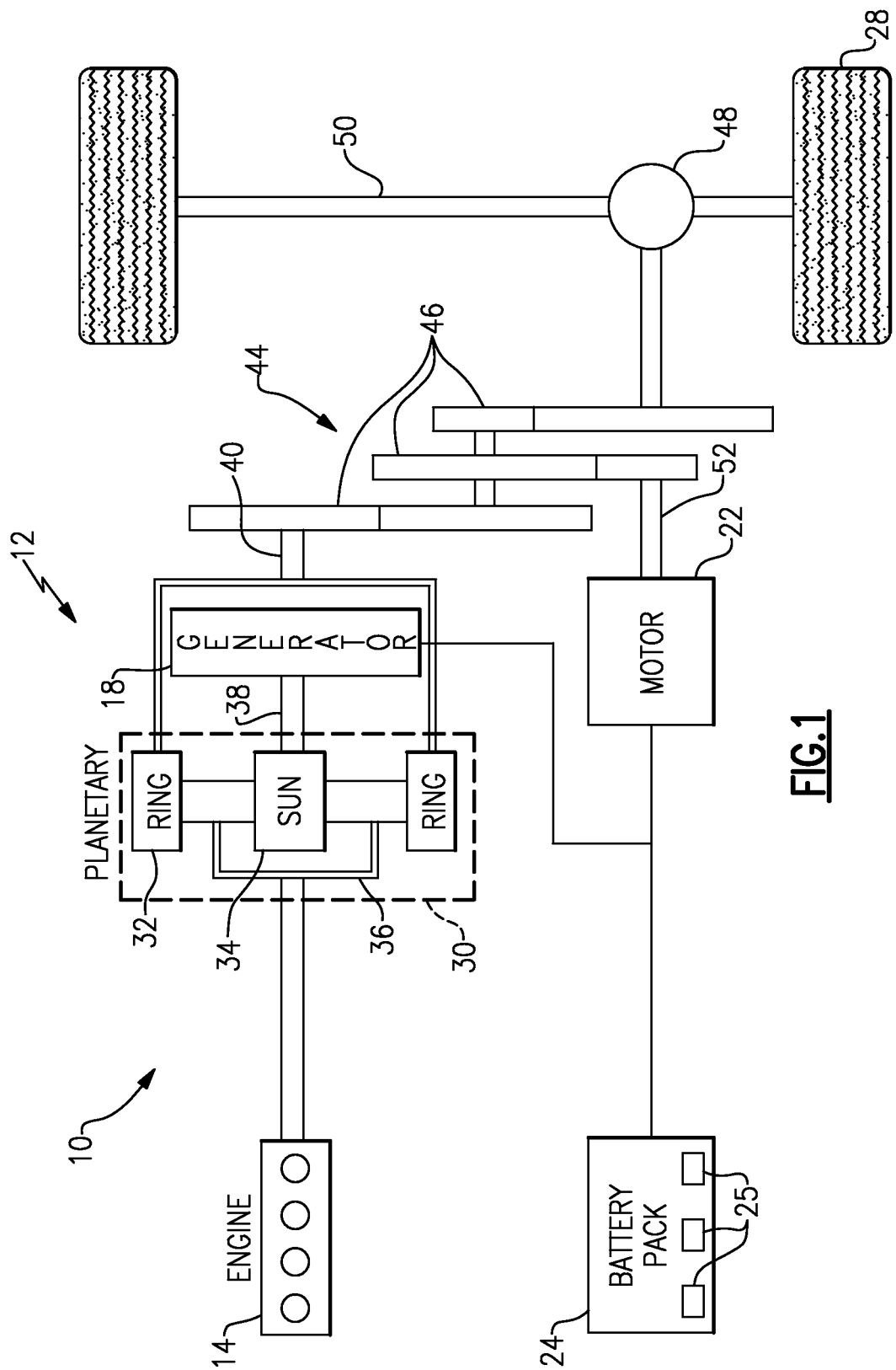
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
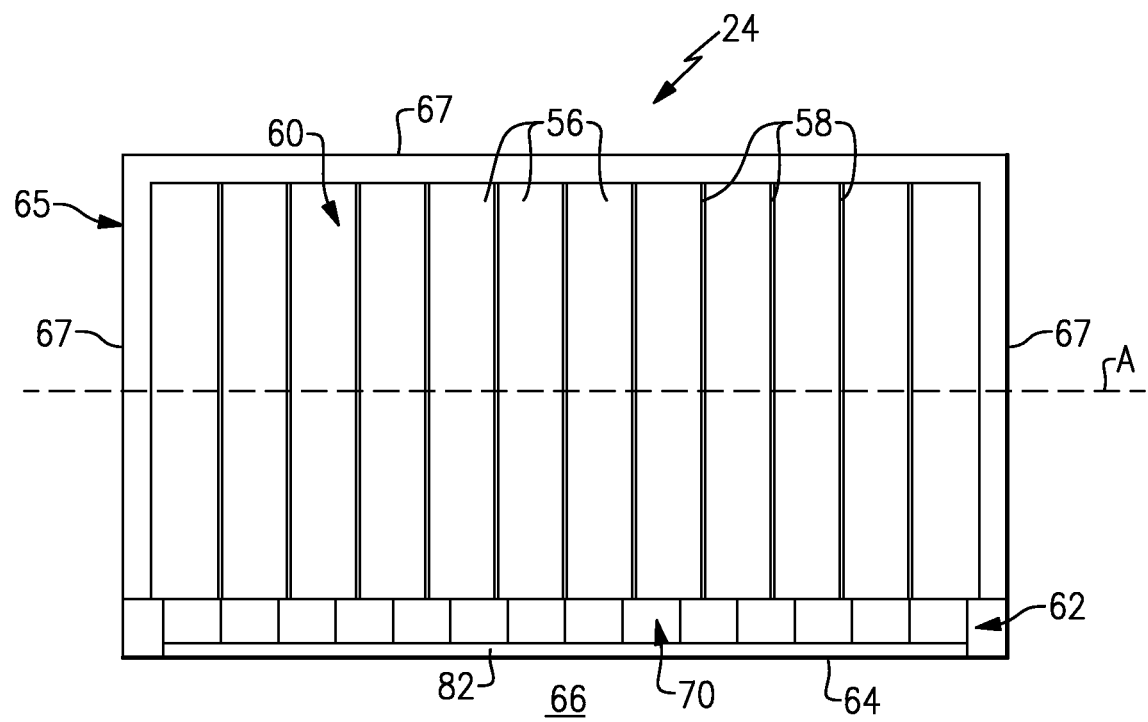
FIG. 2 illustrates a battery pack of an electrified vehicle.

FIG. 2 illustrates portions of a battery pack 24 that can be employed within an electrified vehicle. For example, the battery pack 24 could be part of the electrified vehicle 12 of FIG. 1. The battery pack 24 includes a plurality of battery cells 56 that store electrical power for powering various electrical loads of the electrified vehicle 12. Although a specific number of battery cells 56 are depicted in FIG. 2, the battery pack 24 could employ a fewer or greater number of battery cells within the scope of this disclosure. In other words, this disclosure is not limited to the specific configuration shown in FIG. 2.

The battery cells 56 may be stacked side-by-side along a longitudinal axis A to construct a grouping of battery cells 56, sometimes referred to as a "cell stack." The battery pack 24 can include one or more separate groupings of battery cells 56. In other words, the battery pack 24 could include multiple cell stacks.

In another non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

In yet another non-limiting embodiment, spacers 58, which can alternatively be referred to as separators or dividers, are positioned between adjacent battery cells 56 of each grouping of battery cells 56. The spacers 58 can include thermally resistant and electrically isolating plastics and/or foams. The battery cells 56 and the spacers 58, along with any other support structures (e.g., rails, walls, plates, etc.), may collectively be referred to as a battery array 60. One battery array 60 is shown in FIG. 2; however, the battery pack 24 could include multiple battery arrays.

An enclosure 65 may generally surround each battery array 60 of the battery pack 24. The enclosure 65 includes a plurality of walls 67 that define an interior for housing the battery arrays 60.

Figure 3:
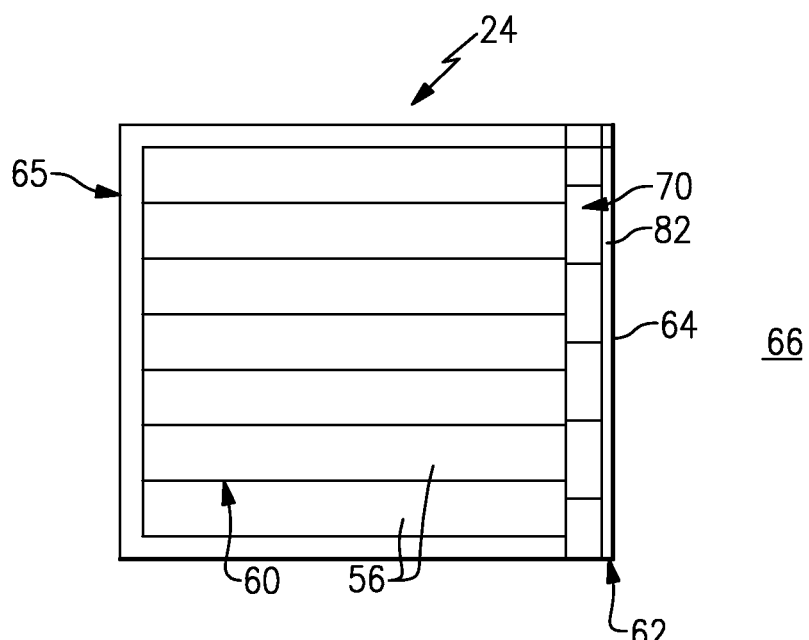
FIG. 3 illustrates another exemplary battery pack.

The battery array 60 of the battery pack 24 is positioned relative to a heat exchanger plate 62 such that the battery cells 56 are either in contact with or in close proximity to the heat exchanger plate 62. Although not shown, a thermal insulation material could be positioned between the heat exchanger plate 62 and the battery array 60. In one non-limiting embodiment, the heat exchanger plate 62 acts as a base of the enclosure 65 (see FIG. 2). In another non-limiting embodiment, the heat exchanger plate 62 acts as a wall (here, a sidewall) of the enclosure 65 (see FIG. 3). In either of these embodiments, the heat exchanger plate 62 includes at least one exterior surface 64 exposed to an exterior environment 66 (i.e., the environment that surrounds the outside of the battery pack 24).

The heat exchanger plate 62 is equipped with features for thermally managing the battery cells 56 of each battery array 60. For example, heat may be generated and released by the battery cells 56 during charging operations, discharging operations, extreme ambient conditions, or other conditions. It is often desirable to remove the heat from the battery pack 24 to improve capacity and life of the battery cells 56. The heat exchanger plate 62 is configured to conduct the heat out of the battery cells 56. In other words, the heat exchanger plate 62 acts as a heat sync to remove heat from the heat sources (i.e., the battery cells 56). The heat exchanger plate 62 can alternatively be employed to heat the battery cells 56, such as during extremely cold ambient conditions. Exemplary heat exchanger plate designs for thermally managing the battery cells 56 of the battery pack 24 are further detailed below.

Figure 4:
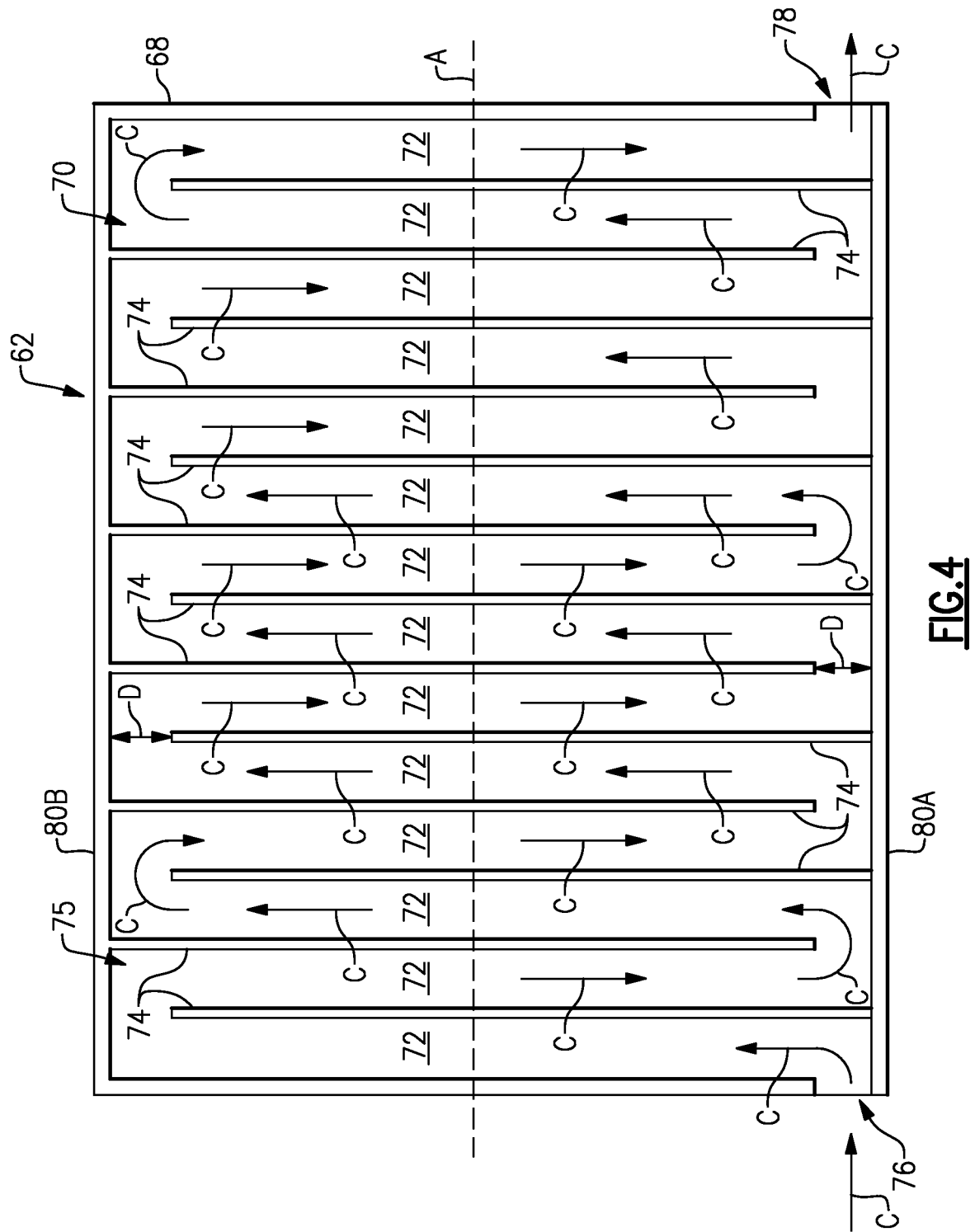
FIG. 4 illustrates a heat exchanger plate of a battery pack.
Figure 5:
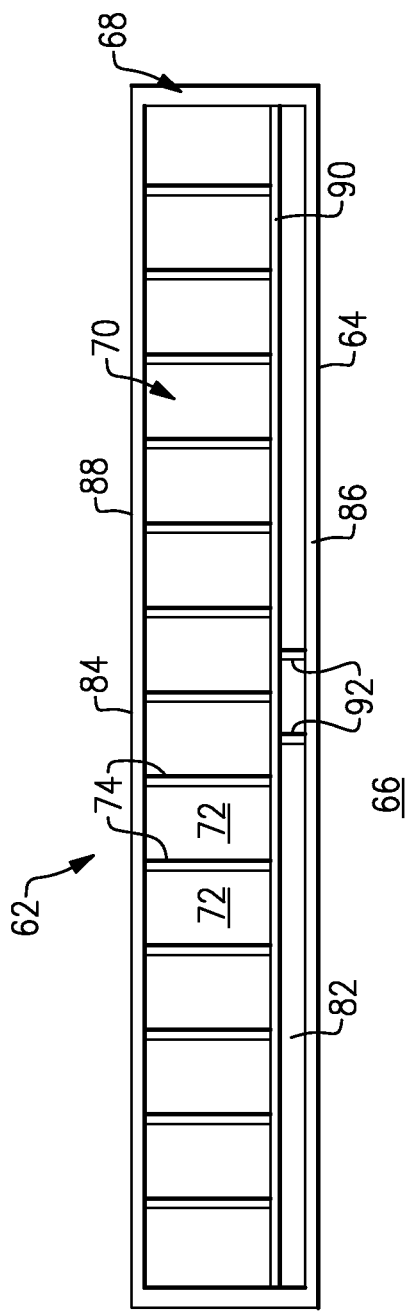
FIG. 5 is a cross-sectional view through section A-A of FIG. 4.

A heat exchanger plate 62 according to a first non-limiting embodiment of this disclosure is illustrated in FIGS. 4 and 5 (with continued reference to FIG. 2). The heat exchanger plate 62 includes a plate body 68 and an internal cooling circuit 70 formed inside the plate body 68. The heat exchanger plate 62 may be an extruded part or a machined part. Other manufacturing techniques are also contemplated within the scope of this disclosure. In another non-limiting embodiment, the heat exchanger plate 62 is made of aluminum. Other materials are also suitable for constructing the heat exchanger plate 62.

A coolant C is selectively circulated through the internal cooling circuit 70 to thermally condition the battery cells 56 of the battery pack 24. In one non-limiting embodiment, the coolant C is a conventional type of coolant mixture such as water mixed with ethylene glycol. However, other coolants, including gases, are also contemplated within the scope of this disclosure.

In one non-limiting embodiment, the internal cooling circuit 70 includes a plurality of fluid channels 72 that extend inside the heat exchanger plate 62. In one non-limiting embodiment, the fluid channels 72 connect to one another for communicating the coolant C through the heat exchanger plate 62. The fluid channels 72 can be configured in different sizes and shapes to help meter and balance the flow of the coolant C through the internal cooling circuit 70. The size and shape of each fluid channel 72 and the total number of fluid channels 72 are not intended to limit this disclosure and can be specifically tuned to the cooling requirements of the battery pack 24.

In one non-limiting embodiment, the fluid channels 72 establish a serpentine passage 75 inside the plate body 68. The serpentine passage 75 extends between an inlet 76 and an outlet 78. Walls 74 are disposed inside the plate body 68 to separate adjacent fluid channels 72 of the internal cooling circuit 70 from one another. The walls 74 extend between opposing end walls 80A, 80B of the heat exchanger plate 62. In one non-limiting embodiment, each wall 74 extends from one of the opposing end walls 80A, 80B toward the other opposing end wall 80A, 80B but terminates prior to reaching the opposing end wall 80A, 80B. For example, the walls 74 may terminate by a distance D inwardly from the opposing end wall 80A, 80B. In this way, the flow of the coolant C is not blocked by the walls 74 and can turn from one fluid channel 72 to another as it travels along the serpentine passage 75.

In use, the coolant C is communicated into the inlet 76 of the serpentine passage 75 and is then communicated through the fluid channels 72 that define the serpentine passage 75 before exiting through the outlet 78. The coolant C picks up the heat conducted through heat exchanger plate 62 from the battery cells 56 as it meanders along its path. Although not shown, the coolant C exiting the outlet 78 may be delivered to a radiator or some other heat exchanging device, be cooled, and then returned to the inlet 76 in a closed loop.

Referring now primarily to FIG. 5, the plate body 68 of the heat exchanger plate 62 includes an interior wall 84, which faces toward an interior of the battery pack 24, and an exterior wall 86, which faces toward the exterior environment 66 (see also FIG. 2). The interior wall 84 includes an exterior surface 88 that interfaces with the battery cells 56 of the battery pack 24, and the exterior surface 64 of the exterior wall 86 is exposed to the exterior environment 66. The plate body 68 may additionally include an internal wall 90. In one non-limiting embodiment, the internal wall 90 is a floor of the internal cooling circuit 70. The internal wall 90 therefore aids in guiding the coolant C as it passes through the internal cooling circuit 70. In another non-limiting embodiment, the internal wall 90 is completely inside the heat exchanger plate 62 and therefore is not directly exposed to either the interior of the battery pack 24 or the exterior environment 66.

An air gap 82 is disposed inside the heat exchanger plate 62. In one non-limiting embodiment, the air gap 82 is disposed between the interior wall 84 and the exterior wall 86 of the plate body 68. In yet another non-limiting embodiment, the air gap 82 is positioned between the exterior wall 86 of the plate body 68 and the internal wall 90 of the plate body 68. The air gap 82 may be positioned at any location inside the plate body 68 that is between the internal cooling circuit 70 and the portion of the plate body 68 that is exposed to the exterior environment 66.

The air gap 82 is configured to limit the thermal transfer of heat from the exterior environment 66 into the internal cooling circuit 70 of the heat exchanger plate 62. For example, the air gap 82, which is a static pocket of air, acts as an insulator so that less heat from the exterior environment 66 is introduced into the internal cooling circuit 70. In other words, the air gap 82 reduces the thermal path between the exterior surface 64 and the internal cooling circuit 70, thereby improving the efficiency of the heat exchanger plate 62.

One or more standoffs 92 can optionally be positioned inside the plate body 68. In one non-limiting embodiment, standoffs 92 extend across the air gap 82 between the exterior wall 86 and the internal wall 90. The standoffs 92 can be used for reinforcing portions of the heat exchanger plate 62.

Figure 6:
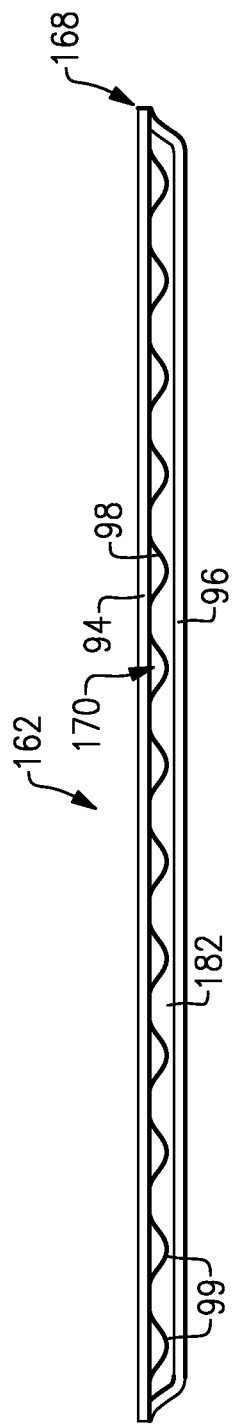
FIG. 6 is a cross-sectional view of another exemplary heat exchanger plate.

FIG. 6 illustrates a heat exchanger plate 162 according to another embodiment of this disclosure. In this non-limiting embodiment, the heat exchanger plate 162 includes a plate body 168 constructed from multiple pieces of stamped metal that are either brazed or welded together. A first plate piece 94 establishes the interior wall of the heat exchanger plate 162, a second plate piece 96 establishes the exterior wall of the heat exchanger plate 162, and a third plate piece 98 establishes the internal wall of the heat exchanger plate 162. In one non-limiting embodiment, the third plate piece 98 is a wavy piece of material that includes a plurality of ridges 99.

The third plate piece 98 is first attached to the first plate piece 94 to establish an internal cooling circuit 170 of the heat exchanger plate 162. The second plate piece 96 is then attached to the first plate piece 94 to construct the heat exchanger plate 162. In one non-limiting embodiment, the second plate piece 96 is attached to the first plate piece 94 (with connected third plate piece 98) such that an air gap 182 extends between the second plate piece 96 and the third plate piece 98. The ridges 99 of the third plate piece 98 do not contact the second plate piece 96 to avoid interrupting the air gap 182.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    a heat exchanger plate including:
        an enclosed, unitary plate body including an interior wall and an exterior wall,
        wherein said exterior wall includes an exterior surface exposed to an exterior environment outside of said battery pack and an interior surface not exposed to said exterior environment;
        a plurality of walls disposed inside said plate body to divide fluid channels of an internal cooling circuit; and
        an air gap enclosed inside said plate body and extending to said interior surface of said exterior wall without extending through said exterior surface of said exterior wall.

2. The battery pack as recited in claim 1, wherein said interior wall includes an exterior surface that faces toward an interior of said battery pack.

3. The battery pack as recited in claim 1, wherein said air gap extends between said exterior wall and an internal wall of said plate body.

4. The battery pack as recited in claim 3, wherein said internal wall establishes a floor of said internal cooling circuit disposed inside said plate body.

5. The battery pack as recited in claim 4, wherein said internal cooling circuit establishes a serpentine passage inside said plate body.

6. The battery pack as recited in claim 1, wherein said plate body includes a first plate piece, a second plate piece and a third plate piece that are connected together.

7. The battery pack as recited in claim 1, comprising at least one standoff extending between said exterior wall and an internal wall of said plate body.

8. The battery pack as recited in claim 1, wherein said air gap is a static pocket of air inside said plate body.

9. The battery pack as recited in claim 1, wherein said air gap is configured to limit the thermal transfer of heat from an exterior environment into an internal cooling circuit disposed inside said plate body.

10. The battery pack as recited in claim 1, wherein said plate body includes opposing end walls, and each of said plurality of walls extends from one of said opposing end walls toward the other of said opposing end walls but terminates prior to the other of said opposing end walls.

11. The battery pack as recited in claim 1, comprising a single inlet for a coolant to enter said internal cooling circuit and a single outlet for said coolant to exit said internal cooling circuit.

12. The battery pack as recited in claim 11, wherein said single inlet is connected to a first channel of said fluid channels and said single outlet is connected to a second channel of said fluid channels.

13. The battery pack as recited in claim 1, wherein said heat exchanger plate is a separate and distinct component from an enclosure of said battery pack.

14. The battery pack as recited in claim 1, wherein said air gap extends across an entire interior length of said plate body.

15. A battery pack, comprising:
    an enclosure defining an interior;
    a battery array housed within said interior;
    a heat exchanger plate separate from said enclosure and including an interior wall proximate said battery array and an exterior wall exposed to an exterior environment outside of said enclosure;
    wherein said heat exchanger plate includes an internal cooling circuit including a plurality of fluid channels;
    a plurality of walls that divide said plurality of fluid channels; and,
    an air gap completely enclosed inside said heat exchanger plate and extending from an interior surface of said exterior wall to an internal wall inside said heat exchanger plate,
    wherein said air gap ends at said interior surface without extending through an exterior surface of said exterior wall.

16. The battery pack as recited in claim 15, wherein said battery array includes a plurality of battery cells positioned relative to said interior wall of said heat exchanger plate.

17. The battery pack as recited in claim 1, wherein said internal cooling circuit establishes a serpentine passage.

18. The battery pack as recited in claim 15, wherein said heat exchanger plate forms a base of said enclosure.

19. The battery pack as recited in claim 15, wherein said heat exchanger plate forms a sidewall of said enclosure.

20. The battery pack as recited in claim 15, wherein said internal wall establishes a floor of an internal cooling circuit disposed inside said heat exchanger plate.

21. The battery pack as recited in claim 15, wherein said air gap is configured to limit the thermal transfer of heat from said exterior environment into an internal cooling circuit of said heat exchanger plate.

22. The battery pack as recited in claim 15, wherein said heat exchanger plate is an enclosed, unitary structure that is a completely separate and distinct component from said enclosure.

23. A battery pack, comprising:
- a heat exchanger plate including an interior wall proximate a battery array inside said battery pack and an exterior wall exposed outside of said battery pack;
- a cooling circuit inside said heat exchanger plate;
- an internal wall establishing a floor of said cooling circuit; and
- an air gap enclosed inside said heat exchanger plate and extending from said floor to an interior surface of said exterior wall and across an entire interior length of said heat exchanger plate.

24. The battery pack as recited in claim 23, wherein said air gap ends at said interior surface without extending through an exterior surface of said exterior wall.

* * * * *